(12) United States Patent
Aly et al.

(10) Patent No.: US 10,664,241 B2
(45) Date of Patent: May 26, 2020

(54) MEMORY SYSTEMS INCLUDING SUPPORT FOR TRANSPOSITION OPERATIONS AND RELATED METHODS AND CIRCUITS

(71) Applicant: University of Virginia Patent Foundation, Charlottesville, VA (US)

(72) Inventors: Mohamed Ezzat El Hadedy Aly, Champaign, IL (US); Kevin Skadron, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 252 days.

(21) Appl. No.: 15/783,548

(22) Filed: Oct. 13, 2017

(65) Prior Publication Data
US 2019/0114147 A1    Apr. 18, 2019

(51) Int. Cl.
*G06F 12/00* (2006.01)
*G06F 7/78* (2006.01)
*G06F 12/1009* (2016.01)
*G06F 9/30* (2018.01)
*G06F 15/80* (2006.01)

(52) U.S. Cl.
CPC .......... *G06F 7/785* (2013.01); *G06F 9/30032* (2013.01); *G06F 12/1009* (2013.01); *G06F 15/8007* (2013.01)

(58) Field of Classification Search
CPC .. G06F 7/785; G06F 12/1009; G06F 9/30032; G06F 15/8007
See application file for complete search history.

(56) References Cited

U.S. PATENT DOCUMENTS

| | | | | |
|---|---|---|---|---|
| 5,481,487 A | * | 1/1996 | Jang | G06F 17/147 708/401 |
| 6,064,252 A | * | 5/2000 | Nara | G06F 1/32 327/544 |
| 7,263,543 B2 | * | 8/2007 | Beaumont | G06F 9/30032 708/400 |
| 7,979,672 B2 | * | 7/2011 | El-Mahdy | G06F 9/30032 708/401 |

OTHER PUBLICATIONS

El-Hadedy, Mohamed & Margala, Martin & Skadron, Kevin. Area-Speed-Efficient Transpose—Memory Architecture for Signal-Processing, 10th HiPEAC Workshop on Reconfigurable Computing. (Year: 2016).*

(Continued)

*Primary Examiner* — Kalpit Parikh
(74) *Attorney, Agent, or Firm* — Stanek Lemon Crouse & Meeks, P.A.

(57) ABSTRACT

A method operating a memory system, can be provided by reading a plurality of data words from a memory system, where each of the plurality of data words is stored in the memory system in a first dimension-major order. The plurality of data words can be shifted into a transpose memory system in the first dimension in parallel with one another using first directly time adjacent clock edges to store a plurality of transposed data words in a second dimension-major order in the transpose memory system relative to the memory system. The plurality of transposed data words can be shifted out of the transpose memory system in the second dimension using second directly time adjacent clock edges.

16 Claims, 12 Drawing Sheets

(56) References Cited

OTHER PUBLICATIONS

El-Hadedy et al., "Low Latency Transpose Memory for High Throughput Signal Processing," IEEE, 2010, pp. 373-376.

El-Hadedy et al., "Performance and area efficient transpose memory architecture for high throughput adaptive signal processing systems," Adaptive Hardware and Systems (AHS), 2010 NASA/ESA Conference, IEEE, 2010, pp. 113-120.

El-Hadedy, et al.; *Dual-Data Rate Transpose—Memory Architecture Improves the Performance, Power, and Area of Signal Processing Systems*; J Sign Process Syst (2017) 88: 167. https://doi.org/10.1007/s11265-016-1199-1 (17 pages).

\* cited by examiner

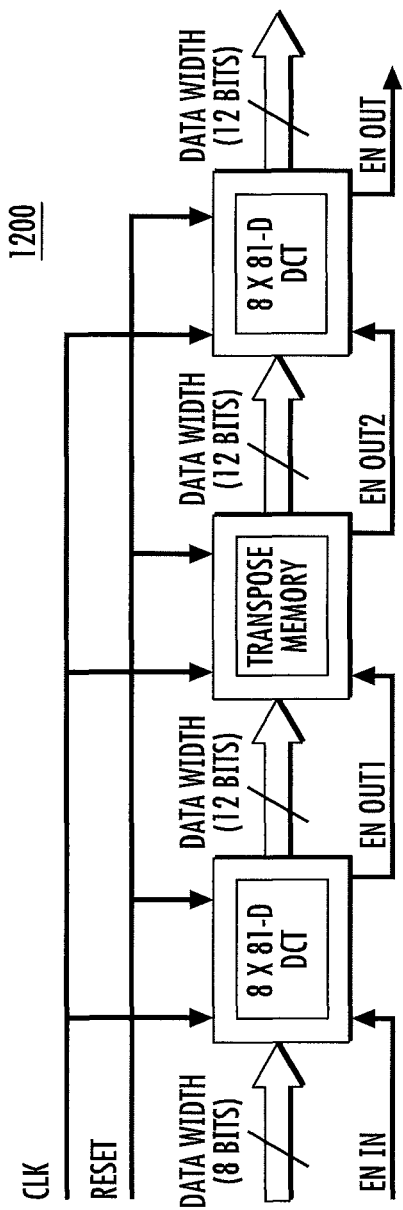
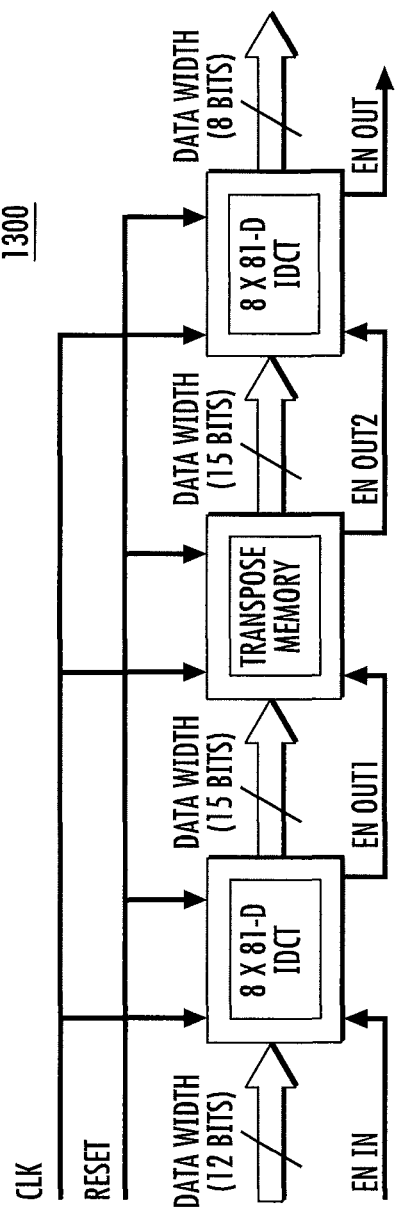
FIG. 12
FIG. 13

US 10,664,241 B2

MEMORY SYSTEMS INCLUDING SUPPORT FOR TRANSPOSITION OPERATIONS AND RELATED METHODS AND CIRCUITS

STATEMENT OF FEDERAL SUPPORT

This invention was made with government support under Grant No. HR0011-13-3-0002 awarded by the Department of Defense/Defense Advanced Research Projects Agency (DARPA) and under National Science Foundation Grant No. CDI-1124931 and by the Center for Future Architectures Research (C-FAR), once of six centers of STARnet, a Semiconductor Research Corporation program sponsored by MARCO and DARPA. The government has certain rights in the invention.

FIELD

The present inventive concept relates to the field of electronics in general and, more particularly, to electronic memory systems.

BACKGROUND

A wide range of applications, such as computer graphics, medical imaging and telecommunications, can utilize signal processing techniques. Signal processing techniques may involve high speed mathematical operations performed in real-time (i.e., the signal may be a continuous function of time that is sampled, digitized, and analyzed in real-time for monitoring or control purposes). Some signal processing operations, such as a discrete cosine transform (DCT) and inverse DCT (IDCT) repeatedly transpose matrices. Other areas may also use transposition operations, such as in linear algebra, spectral methods for partial differential equations, quadratic programming, and the like.

Transposing a matrix using some approaches may consume many clock cycles, such as by repeatedly reading and writing a RAM based cache memory. RAM based approaches can lead to high latency and can incur high cost in terms of power demands. Furthermore, RAM based approaches may present challenges architecturally in reducing, for example, processing pipeline bubbles.

SUMMARY

Embodiments according to the present invention can provide memory systems including support for transposition operations along with related methods and circuits. Pursuant to these embodiments, a method operating a memory system, can be provided by reading a plurality of data words from a memory system, where each of the plurality of data words is stored in the memory system in a first dimension-major order. The plurality of data words can be shifted into a transpose memory system in the first dimension in parallel with one another using first directly time adjacent clock edges to store a plurality of transposed data words in a second dimension-major order in the transpose memory system relative to the memory system. The plurality of transposed data words can be shifted out of the transpose memory system in the second dimension using second directly time adjacent clock edges.

A transpose memory system can include a plurality of memory cells arranged in an array of rows and columns, where the plurality of memory cells can be coupled together to provide a plurality of shift registers, where the shift registers can be configured to shift data provided to the transpose memory system in a row direction of the array or in a column direction of the array responsive to a control signal to the plurality of memory cells using directly time adjacent clock edges to provide a plurality of transposed data words from the transpose memory system.

A transpose memory circuit can include a memory cell including first and second sequential logic circuits, where the memory cell can have a data input coupled to first and second data inputs of the first and second sequential logic circuits, respectively, where the first sequential logic circuit can be clocked by a rising edge of a clock signal to the transpose memory circuit and where the second sequential logic circuit can be clocked by a falling edge of the clock signal that is directly time adjacent to the rising edge of the clock signal.

BRIEF DESCRIPTION OF THE DRAWINGS

FIG. 12 is a block diagram illustrating a signal processing system providing a 2D Discrete Cosine Transform including multiple transpose memory systems in some embodiments according to the inventive concept.

FIG. 13 is a block diagram illustrating a signal processing system providing a 2D Inverse Discrete Cosine Transform including multiple transpose memory systems in some embodiments according to the inventive concept.

DETAILED DESCRIPTION OF EMBODIMENTS ACCORDING TO THE INVENTIVE CONCEPT

Figure 1:
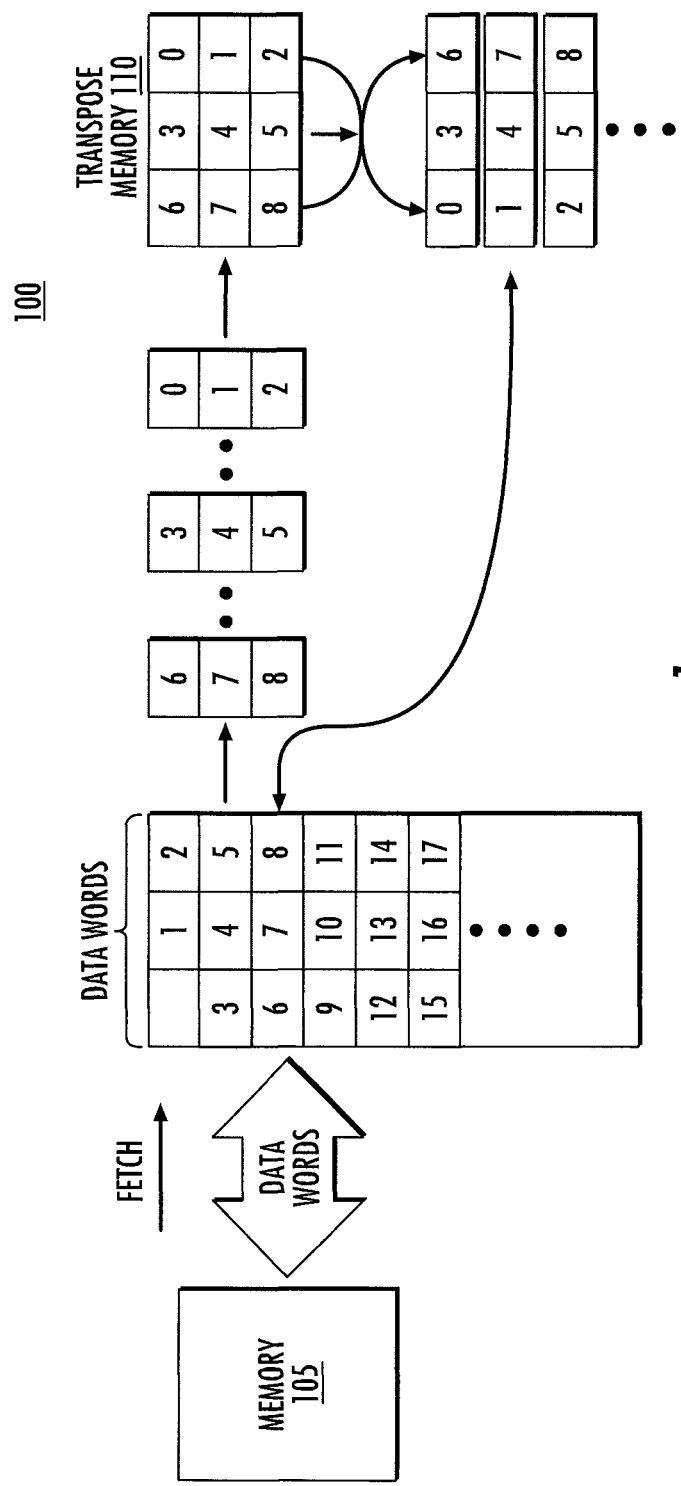
FIG. 1 is a schematic representation of data flow from a general purpose memory through a transpose memory in some embodiments according to the inventive concept.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

As appreciated by the present inventors, embodiments according to the present inventive concept can reduce on-chip real estate demands sometimes associated with transpose memory implementations by recognizing that sequential logic circuits can be wired in parallel with one another to provide a register cell to eliminate the need for a multiplexer circuit otherwise used to select the direction in which the data is to be output. As further appreciated by the present inventors, eliminating the multiplexer circuit at the output of the register cell, may decrease on-chip real estate demands for the memory.

Moreover, wiring the sequential logic circuits in parallel with one another can provide an increase in data flow through of the memory by enabling the sequential logic circuits to be driven by clock signals that have a phase difference that is less than one clock cycle. Still further, eliminating the multiplexer circuit may allowed higher frequency operation by decreasing a critical path for the data flow through the memory by eliminating propagation time through an additional level of combinatorial logic.

For example, in some embodiments according to the inventive concept the outputs of the two parallel sequential logic circuits are wired together. Still further, using two parallel sequential logic circuits having the outputs wired together allows the sequential logic circuits to be run at twice the frequency of a single sequential logic circuit. In such embodiments, a first one of the sequential logic circuit shifts in response to a rising edge of a clock signal, whereas the second sequential logic circuit can operate on the falling edge of the clock signal.

Accordingly, the architecture adopted herein allows both a reduction in the space requirement for the register based transpose memory as well as increase in data throughput by the addition of a single sequential logic circuit. Moreover, the elimination of the multiplexer circuit at the output of the sequential logic circuits can reduce the critical path for data processed by the transpose memory system, which also further improves the throughput performance in some embodiments according to the inventive concept. Transpose memory system architecture is also described in *Dual-Data Rate Transpose—Memory Architecture Improves the Performance, Power, and Area of Signal Processing Systems* by El-Hadedy, M., Guo, X., Margala, M. et al. J Sign Process Syst (2017) 88: 167. https://doi.org/10.1007/s11265-016-1199-1, the entirety of which is hereby incorporated herein by reference.

FIG. 1 is a schematic representation of data flow from a conventional memory system 105 through a transpose memory system 110 in some embodiments according to the invention. According to FIG. 1, the memory system 105 can be a random access memory which stores data in a particular direction-major order such that some data words are located in contiguous memory locations such that when the contiguous data words are accessed they are retrieved as a unit. It will be also understood, however, that certain other data words are not stored in contiguous memory locations. For example, a first set of data words may be stored in the memory system 105 in a particular row such that the first data words are contiguous with one another whereas second data words can be located at a second row in the memory 105 such that the first and second data words are not contiguous with one another in the memory system.

Accordingly, the contiguous relationship between certain data words can be specified as those data words being stored in a particular direction-major order. For example, in some embodiments according to the inventive concept, data words are stored in the memory system 105 in row-major order. In particular, as shown in FIG. 1 the data words shown as fetched from the memory system 105 are organized in row-major order. However, in performing a transposition, this row-major order may lead to processing delays when column-major order would be more efficient, such as when performing a transposition of the data words stored in the memory system 105 as part of a matrix operating used for certain types of imaging processing applications.

As further shown in FIG. 1, the data words organized in the row-major order are fetched from the memory 105 and are reorganized in preparation for shifting into the transpose memory 110. For example, each of the data words fetched from the memory system 105 is shifted in the row direction into the transpose memory 110 in parallel with one another. Accordingly, when the transpose memory 110 is fully populated by the data words due to the shifting in the row direction, the data is as shown in FIG. 1 in the transpose memory 110.

Subsequently, the data words stored in the transpose memory 110 is then shifted in the column direction out of the transpose memory 110 to provide the transposed data words. As shown in FIG. 1, the transposed data words represent a transposition of the data words that were stored in the memory 105 in row-major order. In other words, whereas the data words fetched from the memory 105 were in row-major order, the transposed data words are in column-major order.

It will be understood that although the terms row-major order and column major order are used herein, embodiments according to the inventive concept are not limited to these particular orientations. It will be understood, therefor that the orientation of the ordering of the data can be arbitrary (i.e., any direction) and that the transposition can be made to any other orientation without limitation. Accordingly, embodiments according to the present inventive concept can transpose data words from any first direction-major order to any second direction-major order.

Still further, it will be understood that embodiments according to the inventive concept are not limited to transposition between two directions and that any arbitrary number of dimensions may be used. For example, in some embodiments according to the inventive concept the data words can be data associated with 3 dimensional matrices to be transposed. Still further, the number of dimensions for transposition can be N directions.

Figure 2:
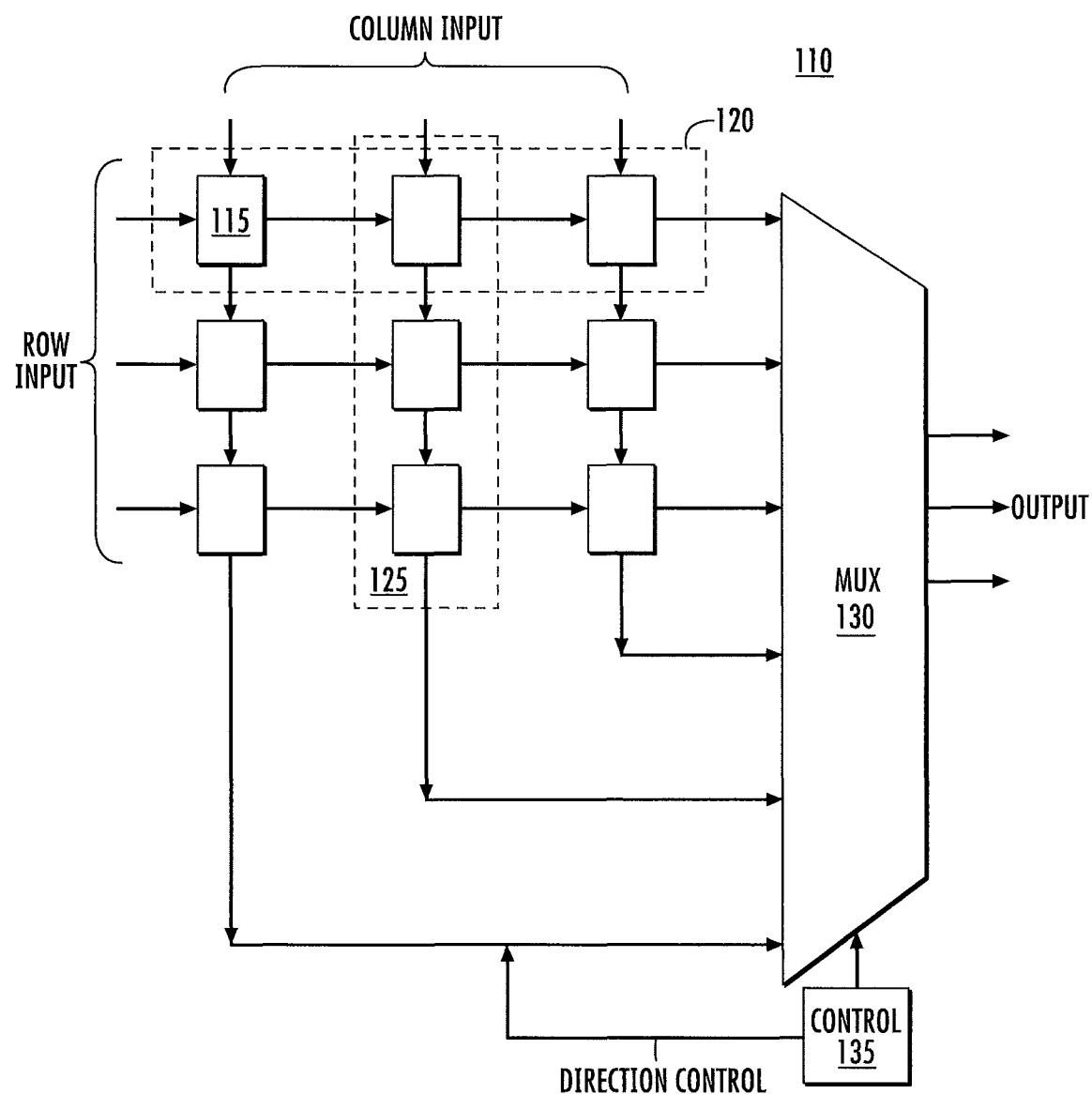
FIG. 2 is a block diagram illustrating a transpose memory system including an array of memory cells interconnected to provide a plurality of row shift registers and a plurality of column shift registers coupled to a multiplexer circuit in some embodiments according to the present inventive concept.

FIG. 2 is a block diagram illustrating the transpose memory 110 including a plurality of memory cells 115 organized into an array of rows and columns and interconnected to selectively shift data words in the row direction or in the column direction based on a control signal from control circuit 135. In some embodiments according to the invention, the control signal from the control circuit 135 can be based on a counter value having N states where shifting by the transpose memory system 110 is provided in the row direction during the first half of N states the whereas the shifting in the column direction can be provided in the second half of the N states. Accordingly, an uppermost (MSB) bit of a counter circuit can select the direction in which data words are shifted in the transpose memory system in some embodiments according to the inventive concept.

As further shown in FIG. 2, the memory cells 115 include an input and an output in both the row and column directions so that each memory cell can receive and transmit data that is being shifted in the row or in the column direction. Moreover, because of the interconnections between each of the memory cells 115 in both the row and column directions, the memory cells can operate in unison as a plurality of shift registers in both the row direction as well as the column direction. For example, the arrangement of memory cells 115 can be thought of as row shift registers 120 that shift data in the row direction, whereas column shift registers 125 shift data in the column direction in some embodiments according to the inventive concept. Still further, the multiplexer circuit 130 can be used to select between data words that are being shifted out of the memory array in the row direction or in the column direction. Still further, the control circuit 135 can also provide the selection signal for the multiplexer circuit 130 to select either the data words shifted out of the memory array in the row direction or in the column direction to provide the output from the transpose memory system 110. It will be understood that although the transpose memory system 110 is shown in FIG. 2 as having single data interconnections to/from the memory 110 and between the memory cells 115, the data words may include any number of bits.

Figure 3:
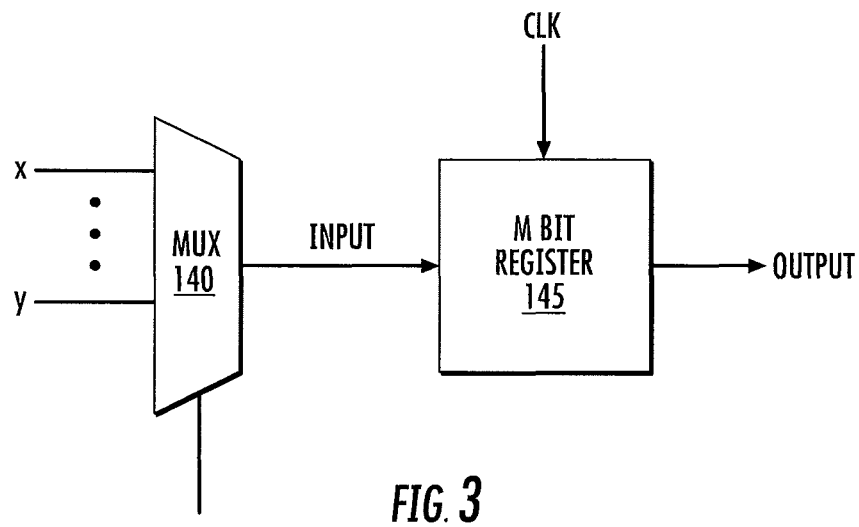
FIG. 3 is a schematic representation of a single memory cell included in the transpose memory system shown in FIG. 2 in some embodiments according to the inventive concept.

FIG. 3 is a schematic illustration of a single memory cell 115 shown in FIG. 2 in some embodiments according to the inventive concept. According to FIG. 3, a multiplexer circuit 140 receives inputs in both the row and column directions of the transpose memory system 110. The multiplexer circuit 140 can select the row or column data words responsive to the select line which can be provided by the control circuit 135 as described above in reference to FIG. 2. The data words selected by the multiplexer circuit are provided to the register 145 that stores the data for the memory cell 115. The register circuit 145 operates responsive to a clock to output the data provided at the input to output in some embodiment according to the inventive concept.

Figure 4:
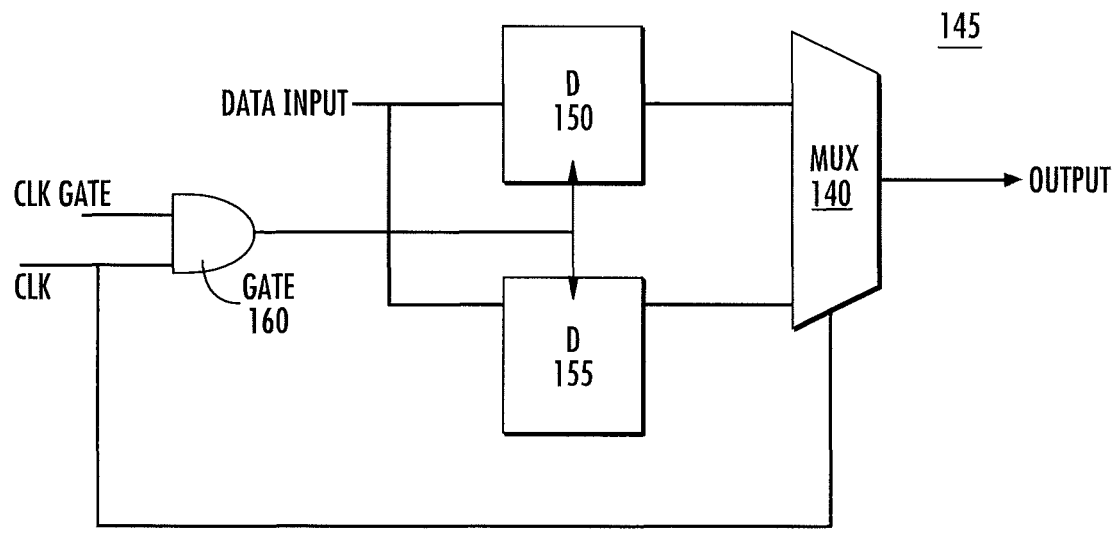
FIG. 4 is a schematic representation of a register circuit in a memory cell shown in FIG. 3 including first and second sequential logic circuits clocked on rising and falling edges of a clock signal, respectively, in some embodiments according to the inventive concept.

FIG. 4 is a block diagram of the register circuit 145 shown in FIG. 3 in some embodiments according to the inventive concept. According to FIG. 4, first and second sequential logic circuits 150 and 155, respectively, receive data input from the multiplexer circuit 140. The first sequential logic circuit 150 can be driven by the rising edge of a clock signal whereas the second sequential logic circuit 155 can be driven by a falling edge of the same clock signal.

Although FIG. 4 shows the same clock signal used to drive two different sequential logic circuit (off different edges), it will be understood that in some embodiments two different clock signals may be used where the phase difference between the two clocks is less than one clock cycle. For example, using two different clock signals may enable the sequential logic circuits to be driven off the same edge (rising or falling). Moreover, more than two clock signals may be used when, for example, more than two sequential logic circuits are wired in parallel. For example, in some embodiments according to the inventive concept, four sequential logic circuits may be wired in parallel where four different clock signals are used to clock the four sequential logic circuits respectively where the four rising edges are equally time-spaced within one clock cycle.

As further shown in FIG. 4, the output of the first sequential logic circuit 150 can be directly coupled to the output of the second sequential logic circuit 155 so as to provide a "wire or" function at the coupled outputs. In operation, the outputs of the first and second sequential logic circuits 150 and 155 change on different edges of the clock signal. However, because the outputs of the first and second sequential logic circuits 150 and 155 are wired together, the wired output switches between the data from the first sequential logic circuit 150 and the data provided by the second sequential logic circuit 155 every half clock cycle. Accordingly, the architecture of the register circuit 145 shown in FIG. 4 can provide data throughput at twice the frequency of some conventional systems. Although as described above, when more than two sequential logic circuits are wired in parallel additional increases in operating frequency may be attained.

As further shown in FIG. 4, the clock signal used to drive the first and second sequential logic circuits 150 and 155 can be selectively blocked at a gate 160 such that when the clock gate signal is switched "off", the clock signal is blocked so that the pipelines provided by the shift registers shown in FIG. 2 can be stalled without introducing bubbles into those pipelines.

As further shown in FIG. 4, in some embodiments according to the inventive concept, a multiplexer circuit 160 may be provided at outputs of the first and second sequential logic circuits 150 and 155. Still further, the clock signal may also be provided to the multiplexer circuit 160 to select between the outputs of the first and second sequential logic circuits at the same frequency with which data is provided by the first and second sequential logic circuits 150 and 155 collectively.

FIGS. 5-11 are schematic representations of data flow through the transpose memory system 110 using a clock signal to drive the two sequential logic circuits wired in parallel in some embodiments according to the inventive concept. The clock signal shown in FIGS. 5-11 includes directly time adjacent clock edges such as a rising clock edge followed by a falling edge of the same clock signal, although embodiments according to the inventive concept are not so limited. According to FIG. 5, the row-major data words are presented at the row inputs of the transpose memory system 110 as described above in reference to FIG. 1 in advance of a transition of the clock signal. According to FIG. 6, on the transition of the first rising edge of the clock signal, the first set of data words is shifted into the memory array for storage in the respective register circuit.

Figure 7:
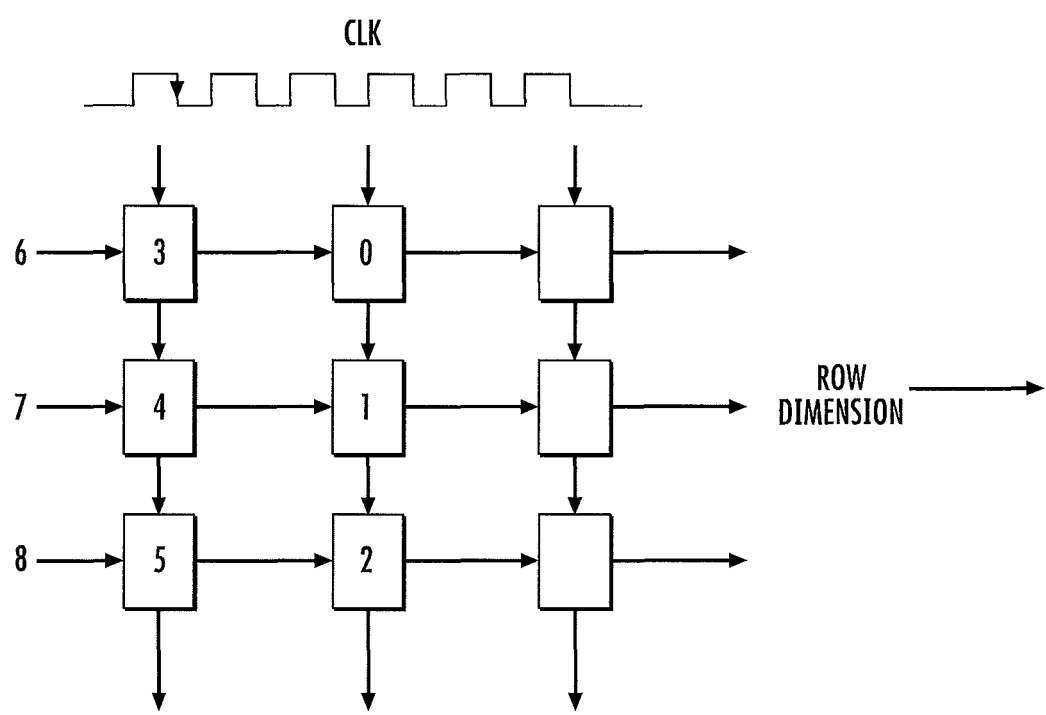
Figure 8:
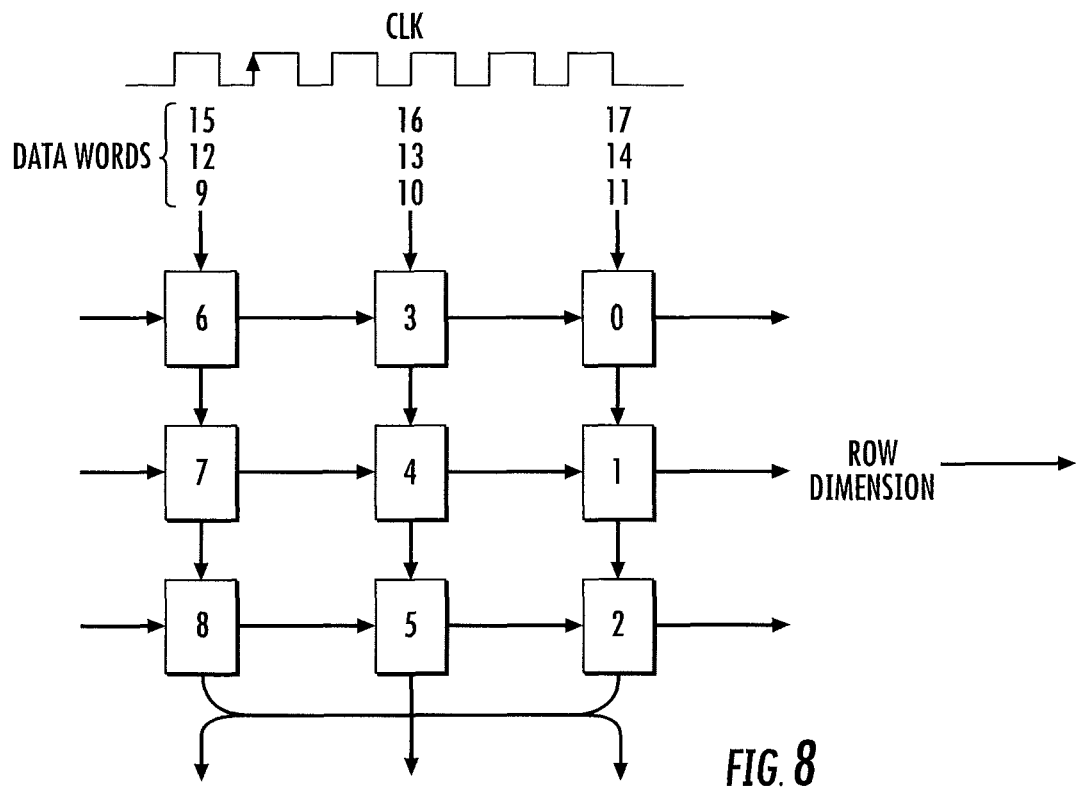

According to FIG. 7, on the next falling clock edge of the clock signal, the data words stored in the first stage of the shift registers is shifted to the next registered circuit in the pipeline whereas the next set of data words provided at the row inputs of the transpose memory system 110 are stored in the first stage of the shift registers. As shown in FIG. 8, upon the next rising edge of the clock signal, the data is further shifted into the pipeline provided by each of the plurality of shift registers in the row direction so that the transpose memory 110 is fully populated with the data words.

Figure 9:
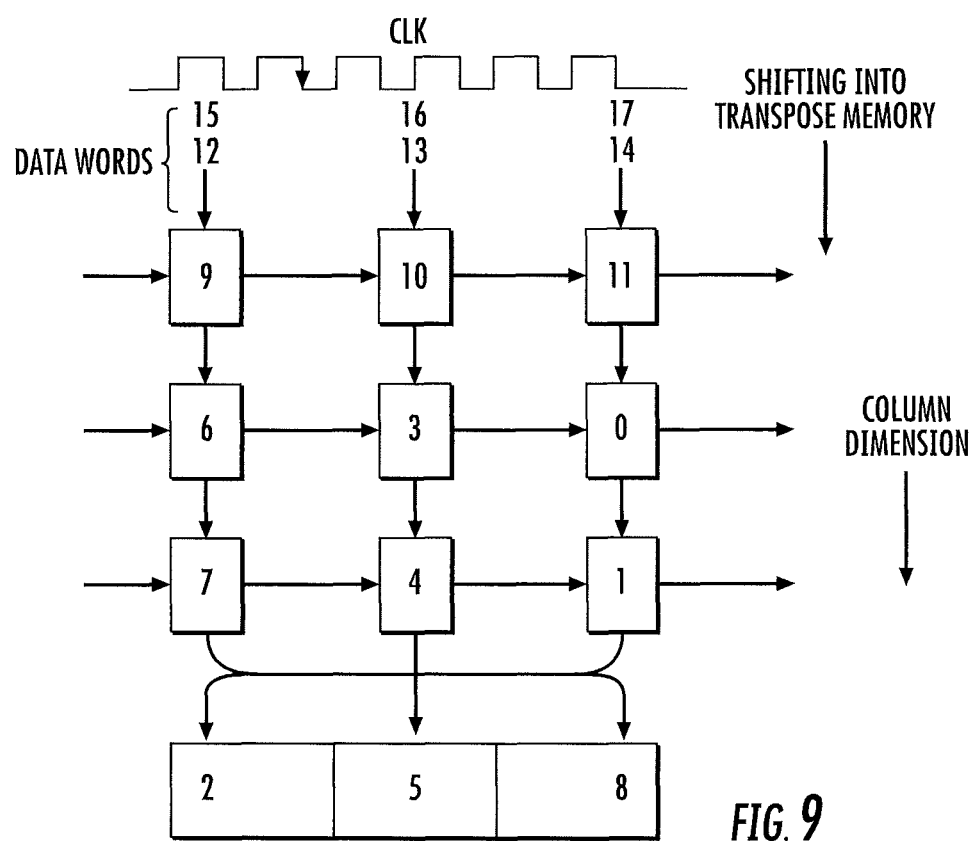

It will be further understood that as shown in FIG. 8, the next set of data words shown in FIG. 1, can be provided at the column inputs of the transpose memory system 110 in advance of the next falling edge of the clock signal so that a pipeline bubble can be eliminated. As shown in FIG. 9, the direction of shifting changes from the row direction to the column direction so that the data words shifted into the pipeline in the lowest most shift register in the row direction are shifted out of the transpose memory 110 to provide a first transposed data word whereas the first data words provided at the column inputs of the transpose memory 110 are shifted into the first stage of the column oriented shift registers in some embodiments according to the present inventive concept.

Figure 5:
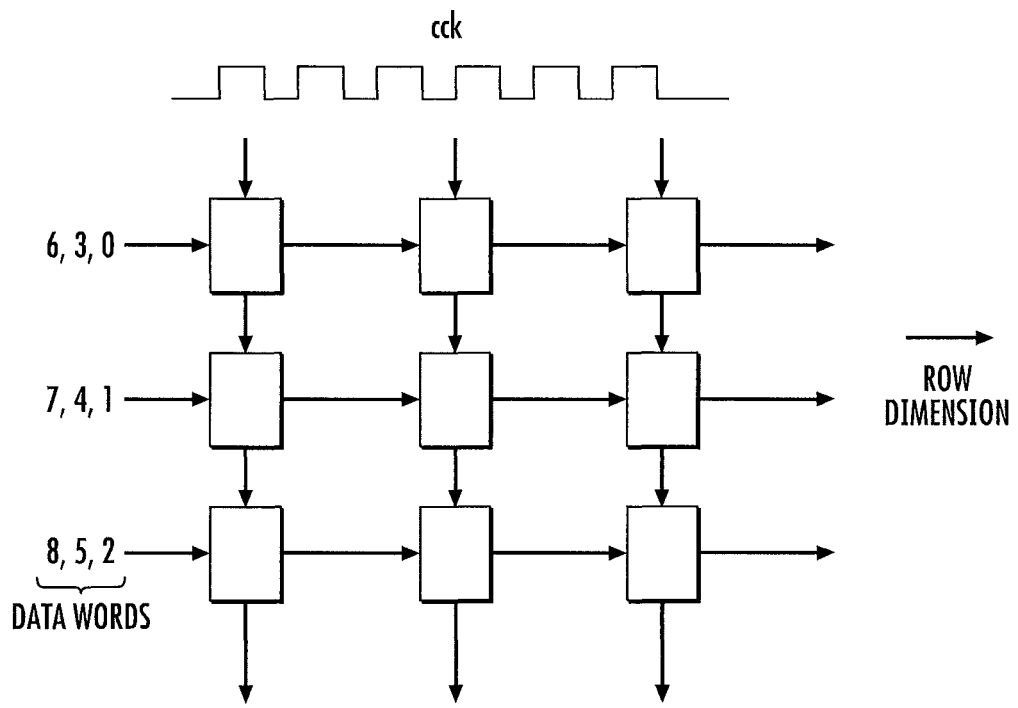
FIGS. 5-11 are schematic representations of data flow through the transpose memory system using both rising and falling edges of a clock signal in the row direction and in the column direction to provide transposed data in some embodiments according to the inventive concept.
Figure 6:
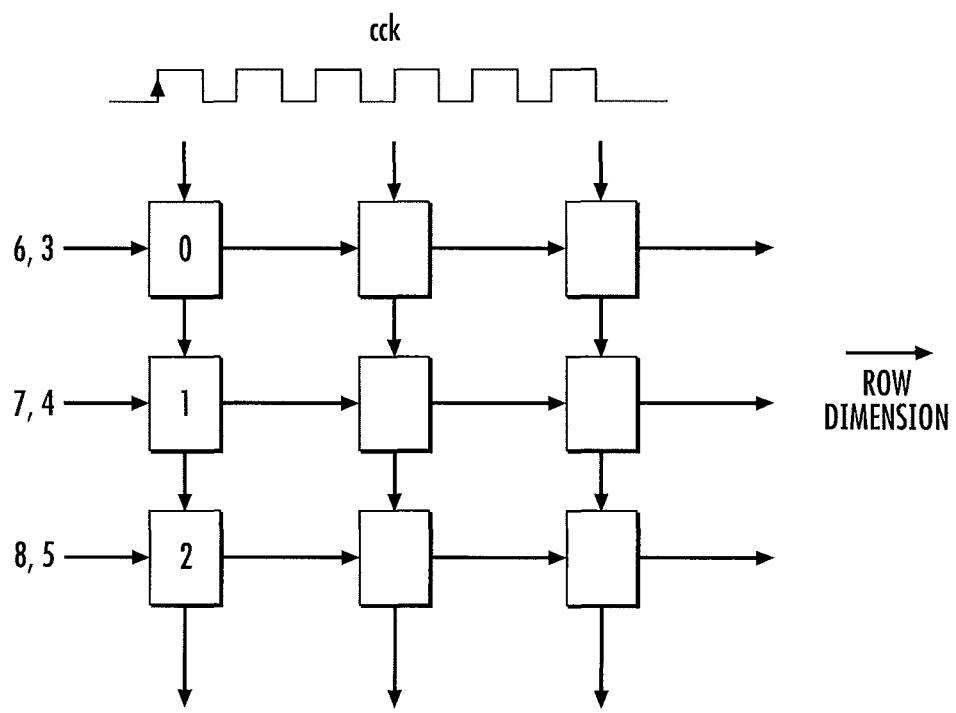
Figure 10:
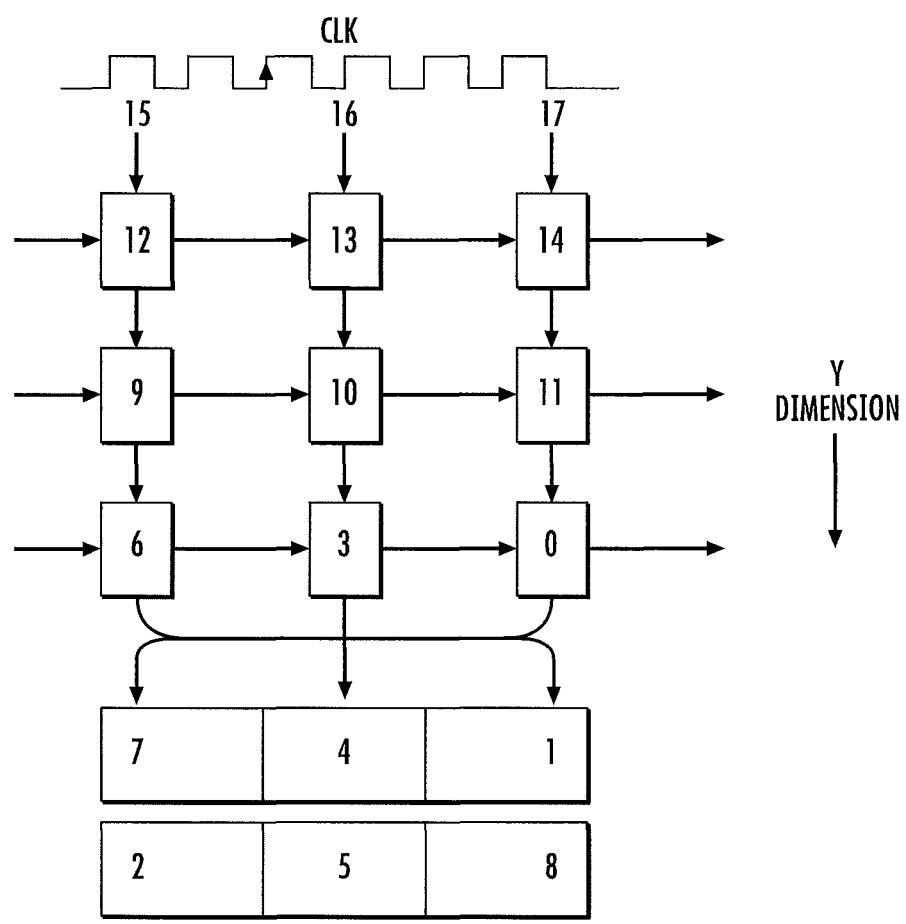
Figure 11:
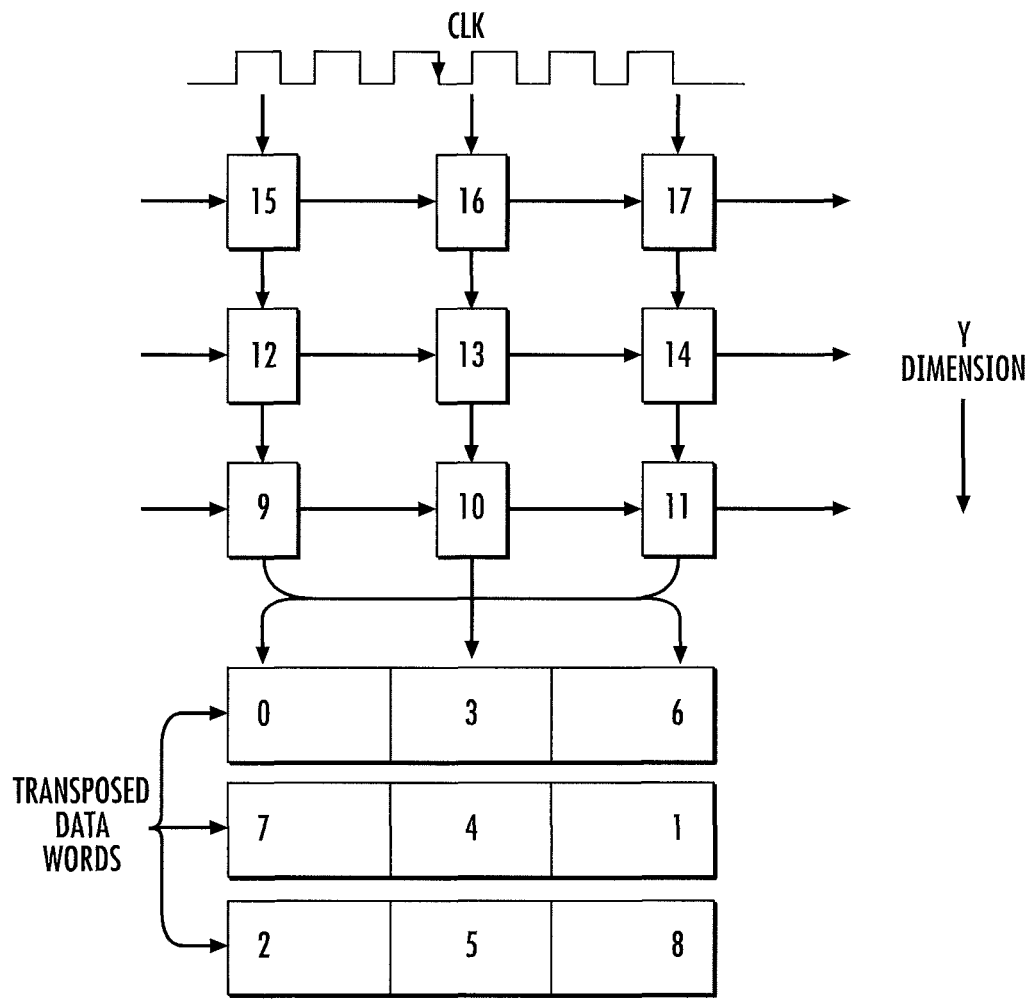

As shown in FIGS. 10-11, the process continues as described above until a full transpose of the data words illustrated in FIG. 5 have been shifted out of the transpose memory 110 to provide a set of fully transposed data words. It will be understood that the data shown in FIG. 11 at the output of the transpose memory system represents a transposition of the data words shown as fetched from the memory system 105 in the row-major order in FIG. 1 above.

Although the transpose memory 110 is shown in FIGS. 2 and 5-11 as a 3×3 array, any array size may be used in some embodiments. Moreover, the size of the array may be selected based on the size of the matrix operations that are to be carried out by an image processing system which includes an embodiment of the inventive concept. For example, if the image processing system is configured to operate on 8×8 matrices, the array may be configured as an 8×8 array.

It will also be understood that the transpose memory array may be configured to carry out respective operations on respective portions of matrices that are to be transposed. For example, some embodiments the image processing system may operate on 16×16 matrices whereas the transpose memory 110 is configured as an 8×8 array. In such operations, the transpose memory 110 may operate on the 16×16 arrays piecemeal. In still other embodiments, the size of the array in the transpose memory 110 may be re-configured based on the particular application. For example, in some embodiments where the image processing system may operate on 16×16 matrices, the array may be re-sized to be 16×16 whereas if the image processing system operates on 8×8 matrices in a subsequent application the array may be re-programmed to provide an 8×8 array when the transpose memory is implemented for example in a programmable device that is configured under software control.

FIG. 12 is a schematic representation of a two dimensional discrete cosine transform system utilizing a transpose memory system 110 in some embodiments according to the present inventive concept. According to FIG. 12, an 8×8 1D discrete cosine transform processor is coupled to inputs of the transpose memory system 110. Still further, as shown in FIG. 12, the transpose memory system is also coupled to a second 8×8 1D DCT processor at the output. Accordingly, the first discrete cosine transform processor can provide data into the transpose memory system for transposition and provide into the 8×8 1D discrete cosign transform which may complete the two dimensional discrete cosine transform using the output from the transpose memory system 110.

FIG. 13 shows an analogous arrangement whereby a single transpose memory 110 receives output from an 8×8 1 dD inverse discrete cosine transform processor and provides transposed output to a second 8×8 1D inverse discrete cosine transform in some embodiments according to the inventive concept.

Figure 14:
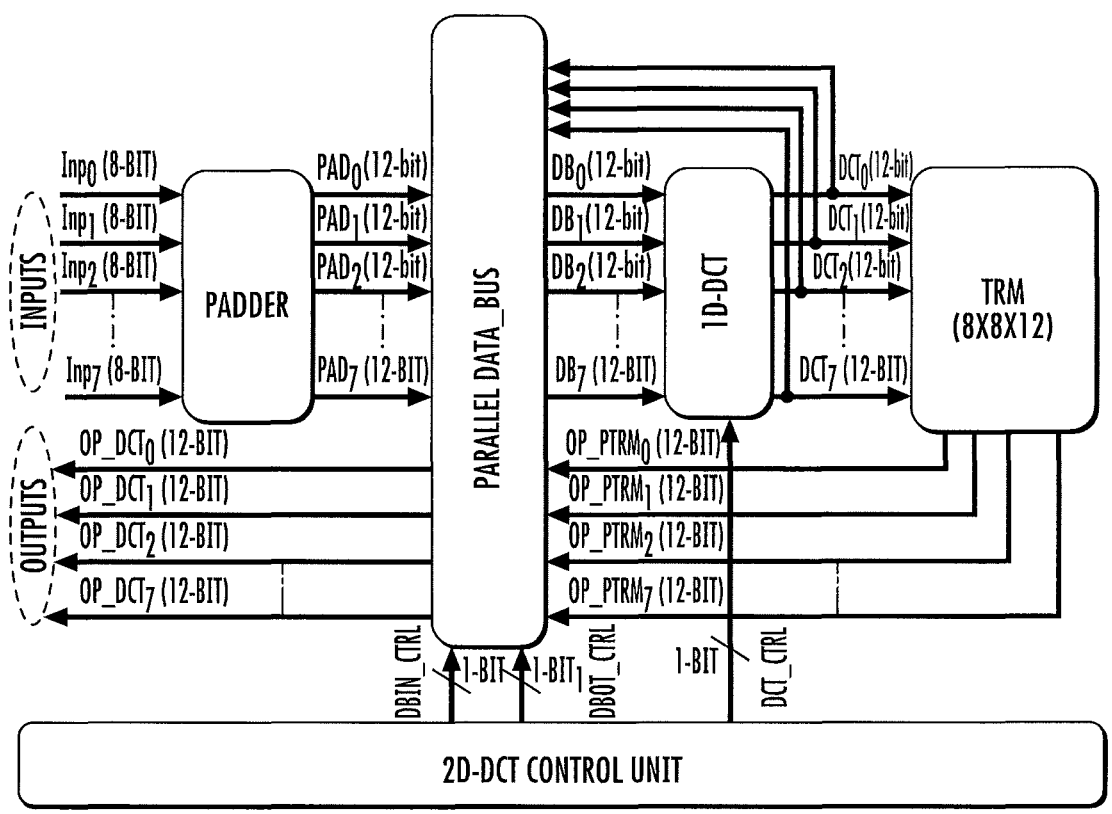
FIG. 14 is a block diagram illustrating a signal processing system providing a 2D Inverse Discrete Cosine Transform including a single transpose memory system in some embodiments according to the inventive concept.

FIG. 14 is a schematic representation of a two dimensional discrete cosign transform processor using a single one dimensional discrete cosign transform processor to reduce space requirements by eliminating one of the 1D discrete cosine transforms shown in FIG. 12 above.

As shown in FIG. 14, the system processes 8×8 blocks with 8-bit input resolution per element. The system includes a "padder", a parallel data-bus, a 1D-DCT, a transpose memory 110 and a control unit. The padder can be a combinational circuit that converts the input stream resolution from 8-bit to 12-bit width by adding four zeros on the most significant bits (i.e., extra bits needed by the 1D-DCT).

The parallel data bus works as two parallel multiplexers. The first multiplexer takes the output streams of the padder and the transpose memory 110 and transmits the streams to the 1D-DCT unit according to the control unit's DBIN_CTRL(1-bit) signal. The second multiplexer routes the output streams from the TRIVI and the 1D-DCT as 2D-DCT outputs according to the control unit's DBOT_CTRL signal.

The control unit includes a 5-bit counter, which outputs data every half cycle and controls the parallel data-bus unit and DBIN_CTRL(1-bit) through DBOT_CTRL(1-bit), DBIN_CTRL(1-bit), and DCT_CTRL respectively.

Figure 15:
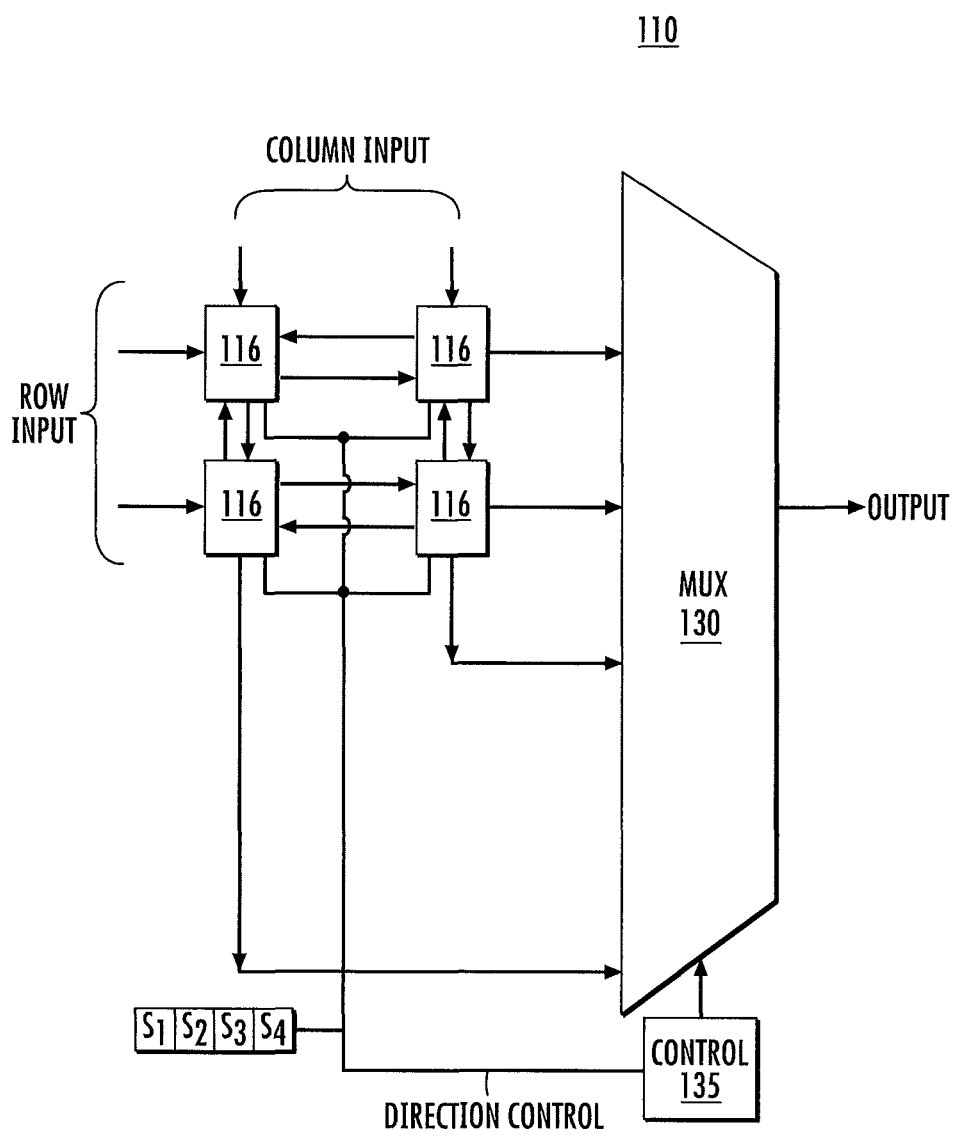
FIG. 15 is a block diagram illustrating a transposed memory system including an array of the memory cells interconnected to provide a plurality of row shift registers and a plurality of column shift registers coupled to a multiplexer circuit in some embodiments according to the present inventive concept.

FIG. 15 is a block diagram illustrating a 2×2 transpose memory system including an array of the memory cells interconnected to provide a plurality of row shift registers and a plurality of column shift registers coupled to a multiplexer circuit in some embodiments according to the present inventive concept. It will be understood that the 2×2 arrangement shown in FIG. 15 is exemplary only and, moreover, any size array may be utilized in accordance with embodiments of the invention. For example, an 8×8 array may be provided by interconnecting 16 of the 2×2 arrangement shown in FIG. 15.

According to FIG. 15, the arrangement of memory cells 116 is configured to provide shuffling of data between the 2×2 array of cells shown in the transposed memory system 110. In particular, the memory cells 116 in the 2×2 array are similar to those shown in FIG. 2, however, the memory cells are interconnected with one another such that data can be shuffled between any of the memory cells separate from shifting of data in/out of the array in the row and column directions. For example, in some embodiments according to the invention, data stored in the upper leftmost one in the memory cells 116 can be shuffled to the lowest most right hand memory cell 116 by transferring data from memory cell 116-1 to 116-2 and then to 116-3 in the lower most right hand column.

Similarly, data stored in the memory cell 116-3 can be shuffled to the memory cell 116-1 via the memory cell 116-2. It will be further understood that a code word S1-S4 can be associated with the data in the transposed memory system 110. The code word S1-S4 can control the shuffling of the data within the transpose memory system 110. For example, once data is shifted into the transpose memory system 110, the code word S1-S4 can indicate which data is to be moved within the transposed memory system 110. For example, the code word S1-S4 may indicate that the data words stored in 116-3 are to be shuffled to the memory cell 116-1 and further that the data words stored in 116-1 are to be shuffled to 116-3. Accordingly, once the data is shifted into the transpose memory system 110, the data may be shuffled within the transposed memory system 110 before being shifted to the output through multiplexer 130.

It will be further understood that in some embodiments according to the inventive concept, separate clock signals can be used for shifting and shuffling data. The clock signal used for shifting can be gated to stop the shifting data words in/out of the transpose memory system 110 while the clock used to shuffle the data within the transpose memory system 110 is applied to the memory cells. Other types of clocking arrangements may also be used.

Figure 16:
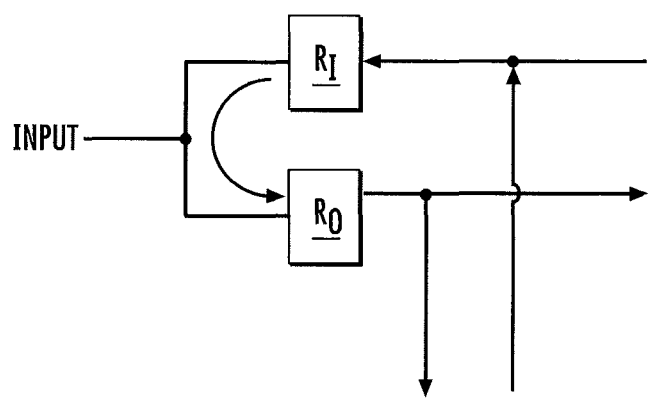
FIG. 16 is a schematic representation of a single memory cell included in the transposed memory system shown in FIG. 15 in some embodiments according to the present inventive concept.

FIG. 16 is a schematic representation of a single memory cell 116 shown in FIG. 15 in some embodiments according to the present inventive concept. According to FIG. 16, a first register R0 within the memory cell 147 can be used to store data after shuffling into the respective memory cell. In contrast, a second register R1 can be used to complete a shuffling of data into the respective memory cell. For example, the first register R0 can be used to store data that is shuffled into the respective memory cell whereas the second register R1 can be used to store data that is to be shuffled out to another respective memory cell. Still further, the first register cell R0 can be used to shuffle data out of the respective memory cell to a destination memory cell for shuffling.

In the drawings, the shapes and dimensions of elements may be exaggerated for clarity, and the same reference numerals will be used throughout to designate the same or like elements. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

It also will be understood that, as used herein, the terms "row" and "column" indicate two non-parallel directions that may be orthogonal to one another. However, the terms row and column do not indicate a particular horizontal or vertical orientation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated elements but do not preclude the presence or addition of one or more other elements.

While exemplary embodiments have been shown and described above, it will be apparent to those skilled in the art that modifications and variations could be made without departing from the spirit and scope of the present disclosure as defined by the appended claims.

What is claimed:

1. A method operating a memory system, the method comprising:

reading a plurality of data words from a memory system, wherein each of the plurality of data words is stored in the memory system in a first dimension-major order;

shifting the plurality of data words into a transpose memory system in the first dimension using first directly time adjacent clock edges to store a plurality of transposed data words in a second dimensions-major order in the transpose memory system relative to the memory system;

shuffling at least one of the plurality of transposed data words in the first dimension-major order and/or in the second dimension-major order in the memory system responsive to a code word that identifies a shift register cell in the in the memory system to which the at least one of the plurality of transposed data words is to be shuffled to provide a plurality of shuffled transposed data words; and shifting the plurality of shuffled transposed data words out of the transpose memory system in the second dimension using second directly time adjacent clock edges, wherein the transpose memory system comprises a plurality of memory cells each including a respective first pair of sequential logic circuits with respective inputs both connected to first adjacent ones of the plurality of memory cells in the first and second dimensions and each including respective outputs both connected to second adjacent ones of the plurality of memory cells in the first and second dimensions, wherein each of the plurality of memory cells further includes a respective second pair of sequential logic circuits with respective inputs both connected to the second adjacent ones of the plurality of memory cells in the first and second dimensions and each including respective outputs both connected to the respective inputs of the respective first pair of sequential logic circuits.

2. The method of claim 1 wherein the first and second dimensions are orthogonal to one another.

3. The method of claim 1 wherein the first dimension is a row dimension of an array used to store the plurality of data words in the memory system and the second dimension is a column dimension of the array used to store the plurality of data words in the memory system.

4. The method of claim 1 wherein the transpose memory system comprises a plurality of memory cells each including a respective pair of sequential logic circuits with respective inputs both connected to first adjacent ones of the plurality of memory cells in the first and second dimensions and with respective outputs both connected to second adjacent ones of the plurality of memory cells in, the first and second dimensions.

5. The method of claim 4 wherein a first of the respective pair of sequential logic circuits is clocked on a rising clock edge and a second of the respective pair of sequential logic circuits is clocked on a falling clock edge.

6. The method of claim 1 further comprising:

blocking a clock signal used to generate the first and second directly time adjacent clock edges responsive to a control signal provided to the transpose memory system.

7. The method of claim 1 further comprising:

shifting the plurality of data words included in each fetched, data group into a transpose memory, system according to a third logical dimension using third directly time adjacent clock edges to provide the plurality of shuffled transposed data words according to a third logical dimension-major order in the transpose memory system, wherein the first, second, and third dimensions are orthogonal to one another.

8. The method of claim 1 wherein the first and second dimensions are defined using modifiable code words associated with each of the plurality of data words.

9. A transpose memory system comprising:
a plurality of memory cells arranged in an array of rows and columns, the plurality of memory cells coupled together to provide a plurality of shift registers, wherein the shift registers are configured to shift data provided to the transpose memory system in a row direction of the array or in a column direction of the array responsive to a control signal to the plurality of memory cells using directly time adjacent clock edges to provide a plurality of transposed data words from the transpose memory system, wherein a first one of the plurality of memory cells comprises a first register and a second register each including a respective first pair of sequential logic circuits with respective inputs both connected to first adjacent ones of the plurality of memory cells in the row and column directions and each including respective outputs both connected to second adjacent ones of the plurality of memory cells in the row and column directions, wherein each of the plurality of memory cells further includes a respective second pair of sequential logic circuits with respective inputs both connected to the second adjacent ones of the plurality of memory cells in the row and column directions and each including respective outputs both connected to the respective inputs of the respective first pair of sequential logic circuits, wherein the first register provides storage for data moved from the first one of the plurality of memory cells to a second one of the plurality of memory cells and wherein the second register provides storage for data moved from the second one of the plurality of memory cells to the first one of the plurality of memory cells to provide shuffling of transposed data in the transpose memory system.

10. The transpose memory system according to claim 9 wherein the plurality of shift registers includes;
a plurality of row shift registers each including a respective input coupled to a respective row input to the transpose memory system and including a respective output coupled to a respective row output from the transpose memory system; and
plurality of column shift registers each including a respective input coupled to a respective column input to the transpose memory system and including, a respective output coupled to a respective column output from the transpose memory system, wherein the plurality of row shift registers and the plurality of column shift registers are defined responsive to a control signal to the plurality of memory cells.

11. The transpose memory system according to claim 9 wherein each respective one of the plurality of memory cells comprises first and second sequential logic circuits with respective inputs thereto connected to an adjacent one of the plurality of memory cells in an adjacent row and column; and
wherein each respective one of the plurality of memory cells includes respective outputs connected to an adjacent one of the plurality of memory cells in an adjacent row and column.

12. The transpose memory system of claim 11 wherein the first sequential logic circuit is clocked on a rising clock edge and the second sequential logic circuit is clocked on a falling clock edge.

13. The transpose memory system of claim 11 further comprising:
a respective multiplexer circuit included in each of the plurality of memory cells and having inputs coupled to the respective outputs of the first and second sequential logic circuits, wherein the respective multiplexer circuit selects one of the inputs for output from the respective multiplexer circuit responsive to a rising clock edge, or a falling clock edge.

14. The transpose memory system of claim 10 further comprising:
a gate configured to block a clock signal used to generate the directly time adjacent clock edges responsive to a control signal provided to the transpose memory system.

15. The transpose memory system of claim 10 further comprising:
a plurality of shift registers each including a respective input coupled to a respective input to the transpose memory system and including a respective output from coupled to a respective output from the transpose memory system in a direction that is different than the row and column directions.

16. The transpose memory, system of claim 10 wherein the row and column directions are selected using modifiable code words associated with the plurality of data words.

* * * * *

UNITED STATES PATENT AND TRADEMARK OFFICE
CERTIFICATE OF CORRECTION

PATENT NO. : 10,664,241 B2
APPLICATION NO. : 15/783548
DATED : May 26, 2020
INVENTOR(S) : Aly et al.

It is certified that error appears in the above-identified patent and that said Letters Patent is hereby corrected as shown below:

In the Specification

Column 8, Lines 6-7:
Please correct "DBIN_C-TRL" to read -- DBIN_CTRL --

In the Claims

Column 10, Claim 1, Line 7:
Please correct "second dimensions-major" to read -- second dimension-major --
Column 10, Claim 1, Line 14:
Please correct "cell in the in the memory system" to read -- cell in the memory system --
Column 10, Claim 4, Line 50:
Please correct "cells in, the" to read -- cells in the --
Column 10, Claim 7, Line 63:
Please correct "fetched, data group" to read -- fetched data group --

Signed and Sealed this
Nineteenth Day of January, 2021

Andrei Iancu
*Director of the United States Patent and Trademark Office*